United States Patent [19]

Volz et al.

[11] Patent Number: 5,567,128
[45] Date of Patent: Oct. 22, 1996

[54] PUMP CONTAINING A PRESSURE VALVE

[75] Inventors: Peter Volz, Darmstadt; Georg Obersteiner, Königstein; Albrecht Otto, Hanau, all of Germany

[73] Assignee: ITT Automotive Europe GmbH, Germany

[21] Appl. No.: 256,695

[22] PCT Filed: Dec. 11, 1992

[86] PCT No.: PCT/EP92/02864

§ 371 Date: Jul. 20, 1994

§ 102(e) Date: Jul. 20, 1994

[87] PCT Pub. No.: WO93/14960

PCT Pub. Date: Aug. 5, 1993

[30] Foreign Application Priority Data

Jan. 24, 1992 [DE] Germany ............... 42 01 826.9

[51] Int. Cl.⁶ .................................. F04B 23/00
[52] U.S. Cl. ............ 417/313; 417/540; 303/116.4
[58] Field of Search ............... 303/115.2, 116.4; 417/540, 273, 313

[56] References Cited

U.S. PATENT DOCUMENTS

| | | | |
|---|---|---|---|
| 4,387,934 | 6/1983 | Farr | 303/116.4 |
| 4,892,363 | 1/1990 | Burgdorf | 303/116 |
| 4,974,628 | 12/1990 | Tepermeister et al. | 137/454.4 |
| 4,988,147 | 1/1991 | Zirps | 303/116 |
| 5,078,458 | 1/1992 | Budecker et al. | 303/116.4 |
| 5,094,599 | 3/1992 | Budecker | 417/534 |
| 5,209,553 | 5/1993 | Burgdorf et al. | 303/116.4 |
| 5,213,482 | 5/1993 | Reinartz et al. | 417/540 |

FOREIGN PATENT DOCUMENTS

| | | |
|---|---|---|
| 0387506 | 1/1990 | European Pat. Off. . |
| 0408177 | 1/1991 | European Pat. Off. . |
| 2851134 | 6/1980 | Germany . |
| 3808901A | 10/1989 | Germany . |
| 3912935 | 12/1990 | Germany . |
| 4201825 | 7/1993 | Germany ............... 303/116.4 |
| 4301287 | 7/1994 | Germany ............... 303/116.4 |
| 2126297 | 3/1984 | United Kingdom . |
| 2212872 | 8/1989 | United Kingdom ............... 303/116.4 |
| 2217412 | 10/1989 | United Kingdom ............... 303/116.4 |

OTHER PUBLICATIONS

International Search Report for application PCT/EP90/00131 filed Jan. 24, 1990.

International Search Report for application PCT/EP92/02864 filed Nov. 12, 1992.

*Primary Examiner*—Peter Korytnyk
*Attorney, Agent, or Firm*—J. Gordon Lewis; Thomas N. Twomey

[57] ABSTRACT

The invention provides a pump including a pressure valve which is formed within a carrier element capable of being inserted into the pump casing, with the carrier body including a channel leading into a chamber which, in turn, is in communication, through a restrictor, with the brake circuit to be energized. The carrier element, substantially, is of a cylindrical configuration, with the channel leading to the side wall of the cylinder, and the carrier element, in part, being inserted into a cup-shaped retaining element, and with the outer diameter of the carrier element being only slightly smaller than the inside diameter of the closure member.

6 Claims, 4 Drawing Sheets

PUMP CONTAINING A PRESSURE VALVE

TECHNICAL FIELD

The present invention relates to pumps containing pressure valves.

BACKGROUND OF THE INVENTION

A pump of the afore-mentioned type is disclosed by DE-OS 29 12 935. The pump described therein is provided for use in an anti-locking hydraulic braking system. To minimize the noise emission of the pump during operation, it is provided to add to the pressure valve a damping chamber, a check valve and a restrictor.

The pressure valve and the check valve are formed within a valve carrier suitable to be inserted into the pump casing. A cup-shaped support is screwed into the casing to hold the valve carrier. Provided between a front side of the valve carrier and the bottom of the cup is an expansion chamber confined by a hard-elastic rubber element. The element is intended to accommodate pressure peaks in the pressure fluid at the outlet of the pump that would cause noises in the connected braking system.

It is the object of the invention to further reduce this noise.

DE-OS 28 51 134 discloses an anti-locking hydraulic braking system, wherein a lightly prestressed reservoir is provided on the output of the pump. If the pump is actuated during an anti-locking control, it first delivers a predetermined amount of pressure fluid to the reservoir. Because the brake conduit (through the master cylinder under a pedal force) is under a high pressure, the pressure fluid admitted to the reservoir, during a braking operation, cannot return to the brake conduit. This will involve the advantage that no damage can be done to the sealing sleeves of the master cylinder pistons. The pressure fluid introduced into the reservoir will only get back into the brake circuit once the driver has terminated the braking operation, withdrawing the pedal force acting upon the pedal.

Another object of the invention, therefore, resides in integrating a reservoir of this type into the pump casing.

The afore-mentioned object is realized by the present invention. Further advantageous embodiments are concerned with the check valve, a filter, the configuration of another annular chamber to insure a better connection of the outlet of the pump to the brake conduit system, and with a screw-in aperture enabling the pump set to be adapted to the vehicle braking system.

According to another embodiment, a switch valve is integrated in a valve carrier to block a by-pass conduit leading to a restrictor in the brake conduit. As soon as the pump starts to deliver, the restrictor causes a pressure drop so that the differential pressure on the inlet valve is reduced. This measure, equally, causes a noise reduction.

The invention will now be described with reference to the following figures.

BRIEF DESCRIPTION OF THE PREFERRED EMBODIMENTS

Figure 1:
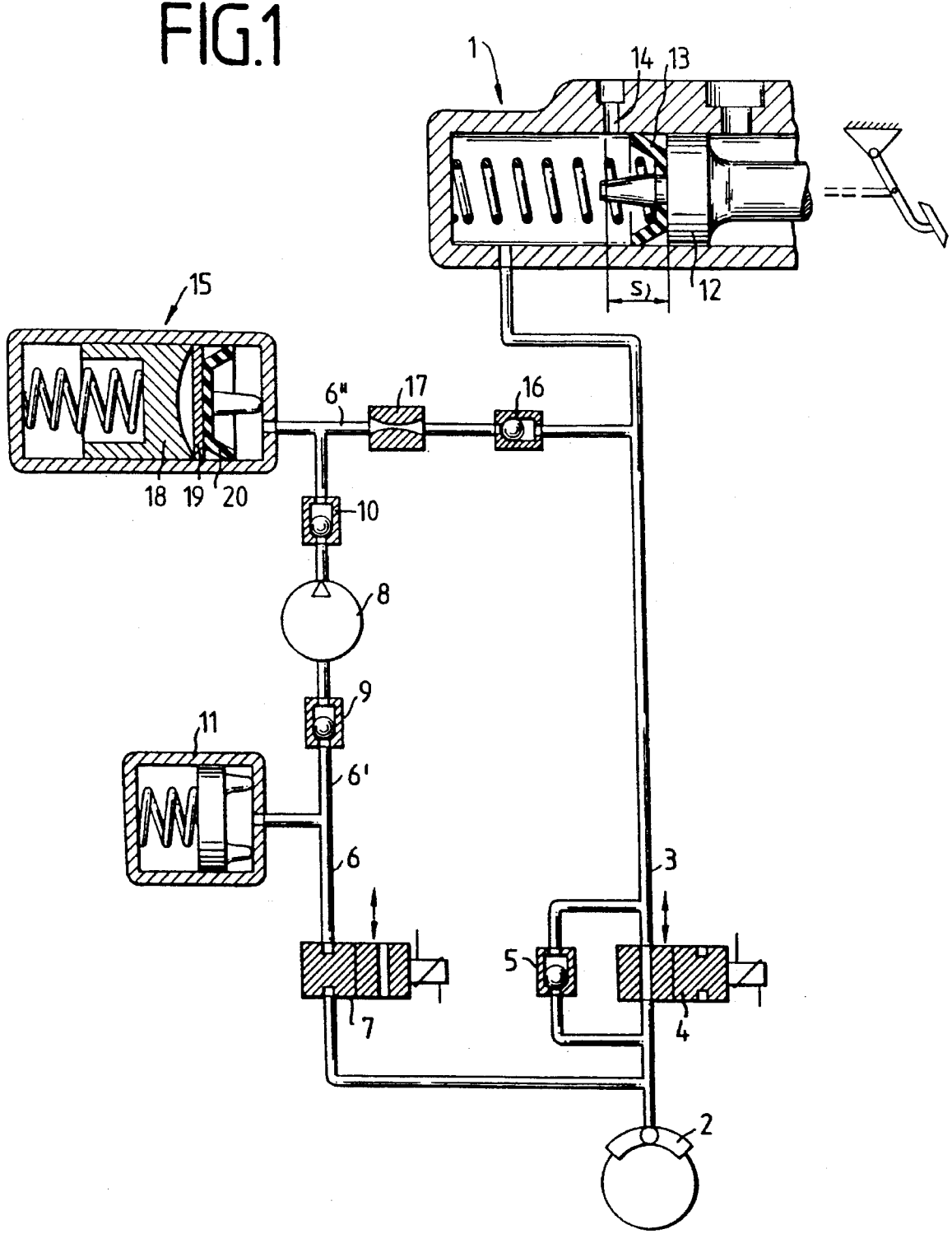
FIG. 1 shows a hydraulic circuit configuration of an anti-locking braking system.

Now referring to FIG. 1, the braking system comprises a master brake cylinder 1 connected to a wheel brake 2 through a brake conduit 3. An inlet valve 4 is inserted into the brake conduit 3, which inlet valve 4, in the braking position thereof, keeps open the brake conduit and, in the switching position, blocks the brake conduit. Switched in parallel to the inlet valve is a check valve 5 opening toward the master cylinder. The check valve enables an immediate pressure decrease in the wheel brakes once the actuating force exerted on the master brake cylinder is lowered.

The wheel brake 2, through another conduit, i.e. the return conduit 6, is in communication with the master brake cylinder. Provided in the conduit is a pump 8 including a suction valve 9 and a pressure valve 10. Inserted between the wheel brake 2 and the pump 8 is an outlet valve 7 which, in the basic position thereof, blocks the return conduit 6 and, in the switching position, releases the return conduit. Coupled to the intake side of the pump, i.e. between the intake valve 9 and the outlet valve 7, is a low pressure reservoir (hereinafter referred to as return reservoir 11) serving to temporarily take up pressure fluid not directly redelivered to the master cylinder by the pump.

The master brake cylinder includes a piston 12 connected to a pedal (symbolically illustrated). Secured to the piston 12 is a sleeve 13 which, in the basic position of the piston as shown is disposed directly ahead of an outlet bore 14 which is connected to a reservoir (not shown). In the basic position of the piston 12, there is, therefore, a connection between the reservoir and the brake circuit. If the piston 12, under the action of the pedal force is displaced (to the left as shown in the illustration), the sleeve 13 sweeps across the outlet bore 14 so that the brake circuit is separated from the reservoir to enable a pressure to be built up in the brake circuit. The distance between the basic position of the piston 12 and the position in which the sleeve has completely swept across the outlet bore 14, is designated by s.

The afore-described braking system is now provided with another low-pressure reservoir (hereinafter referred to as transitory reservoir 15) connected, according to FIG. 1, to the pressure area 6" (between the pump and the master brake cylinder) of the return conduit 6. It consists of a piston 18 having a sleeve 20 and separating the reservoir chamber from the atmosphere. The sleeve 20 is supported on a leaf spring 19. The leaf spring 19 is able to locate itself in a curvature at the bottom of the piston. This measure is intended to suppress noise emissions. The piston 18 is under the action of a spring only slightly prestressed. Disposed in the pressure area 6" of the return conduit 6, in the zone between the transitory reservoir 15 and the termination of the return conduit 6 in the brake conduit 3, are a restrictor 17 and a check valve 16. The two elements are connected in series. The check valve 16, in a non-controlled braking operation, prevents pressure fluid from entering the transitory reservoir 15.

The operation of a braking system using the pump of the present invention will now be explained. Through actuating the pedal, a pressure can be built up in the wheel brake 2. Sensors monitor the rotating pattern of the wheel to thereby detect any locking risk. Upon occurrence of a locking event, the system will switch to the anti-locking (ABS) mode.

During the ABS mode, the pump is in operation. For decreasing the pressure in the wheel brake, the inlet valve 4 is now closed and the outlet valve 7 is opened, thereby causing pressure fluid to pass from the wheel brake into the return reservoir 11, from where it is first delivered, via the pump, to the transitory reservoir 15.

As long as the reservoir 15 is not yet completely filled, the pressure prevailing ahead of the check valve 16 is low as the spring of the transitory reservoir 15 is only lightly prestressed. Once the transitory reservoir 15 is completely filled, the piston 18 abuts rearward stop thereby enabling the pressure before the check valve 16 to rise. Once the pressure of the master cylinder is reached, pressure fluid flows, through the check valve 16, to the master brake cylinder. The reservoir 15 cannot be evacuated at this time as this would result in dropping the pressure before the check valve 16, thus being unable to open the check valve 16 against the master cylinder pressure. Hence, during control and as long as a pressure prevails in the master brake cylinder, the transitory reservoir 15 remains filled. It is only during release of the pedal and upon a pressure drop in the master cylinder that the spring of the transitory reservoir 15 is able to displace the piston 18 and to cause the pressure fluid contained in the transitory reservoir 15 to be passed to she master brake cylinder 21, with the sleeve 13 sweeping across the outlet bore 14 in non-pressurized manner, thereby preventing any damage thereto from occurring.

Figure 2:
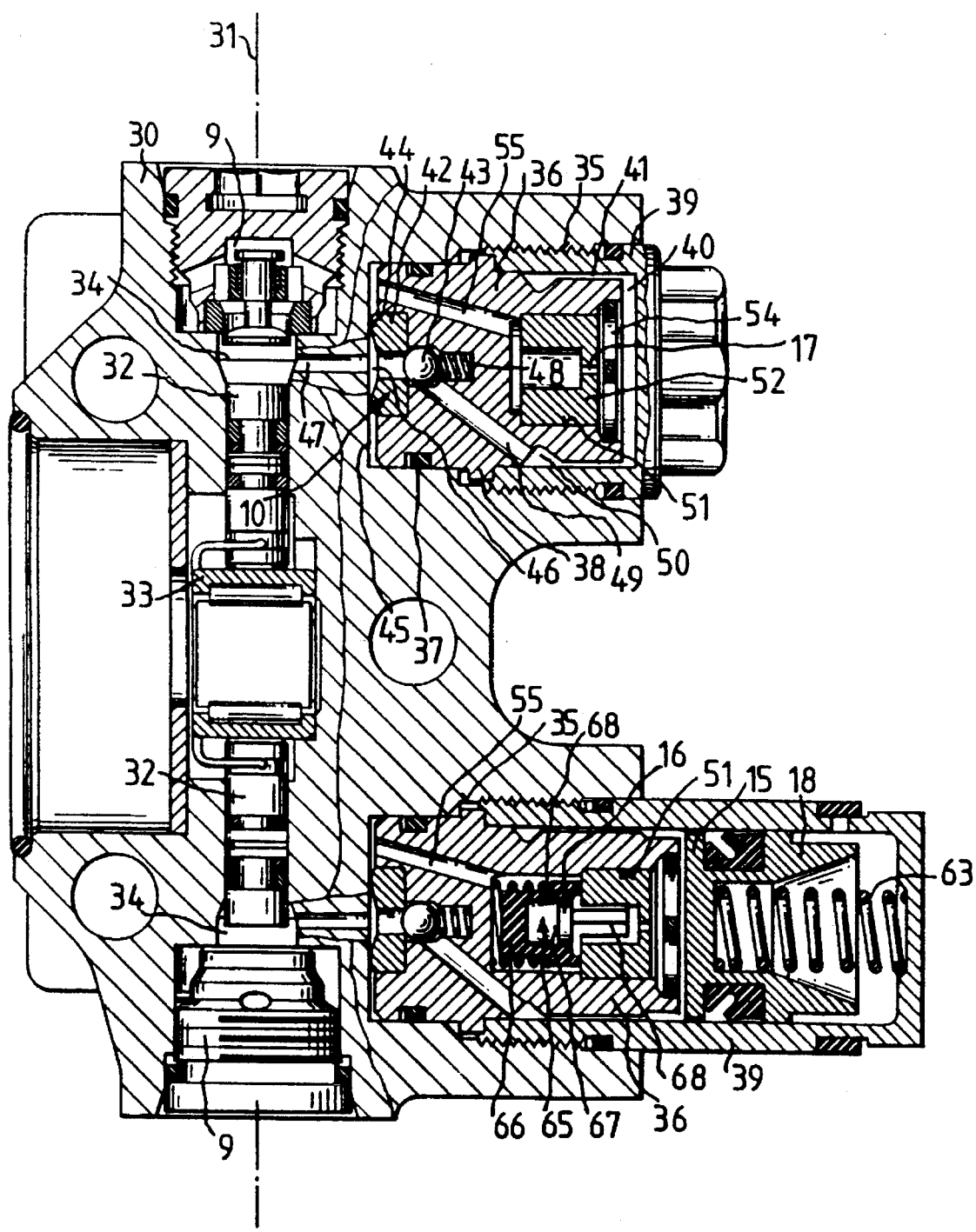
FIG. 2 shows a pump casing provided with a pressure valve cartridge and an integrated reservoir.

FIG. 2 shows an embodiment of the pump 8 including pressure valve 10, restrictor 17, check valve 16 and reservoir 15. In addition, FIG. 2 is a sectional view of a pump casing 30. Disposed in an axis 31 of casing 30 are pump pistons 32 actuated through an eccentric 33. The pump is of a dual-circuit configuration energizing a brake circuit by respectively one circuit.

The pistons 32 confine the pump chambers 34 which, respectively through a suction valve 9, are connected to the return conduit 6 (see FIG. 1). The suction valves 9 are disposed on the axis 31 of the casing 30. Disposed in a direction vertical to the axis 31, in casing 30, are two stepped, blind-end bores 35. Each of the blind-end bores corresponds to a pump chamber 34. Each of the blind-end bores 35 accommodates a cylindrically shaped valve carrier 35 held by a cup-shaped closure member 39.

As shown in the upper part of FIG. 2, the valve carrier 36 accommodates the pressure valve 10 and a restrictor 17. As shown in the bottom part, the reservoir 15 and the check valve 16 are additionally integrated. This form of embodiment has been chosen for the sake of ease; basically, either circuit, can, equally, be associated to the one or to the other of said forms of embodiment.

The two types of reservoirs, substantially, are of an identical design so that, in the following, reference will only be made to the upper partial depict. Supplementary modifications will be described in the bottom part of FIG. 2.

The stepped blind-end bore 35, in the larger diameter area opening toward the outside, comprises an internal thread. Sealingly inserted in the bottom part of the blind-end bore disposed in the interior of the casing, is the cylinder-shaped valve carrier 36. In addition, the valve carrier 36, at the bottom end thereof, comprises seal 37.

The bottom end makes up approximately one third of the all-over length of the valve carrier 36. Coupled to the area of the valve carrier 36 inserted into the bottom part of the blind-end bore 35, is a circumferential edge 38 cooperating with the cup-shaped closure member 39.

The closure member 39 comprises a sleeve and a bottom. The sleeve carries an external thread and is screwed into the internal thread of the blind-end bore 35. The edge of the sleeve is supported on the edge 38, thereby fixing the valve carrier 36 in the casing. The upper part of the valve carrier 36 extending approximately across ⅔ of the total length of the valve carrier, is located within the closure member 39. Formed between the front side of the valve carrier 36 and the bottom of the closure member 39 is a chamber 40.

The upper part of the valve carrier is of a cylindrical configuration, with the cylinder being of a diameter which is slightly smaller than the inside diameter of the sleeve of the closure member 39, thereby forming an annular gap 41 between the cylindrical wall of the valve carrier and the inner wall of the sleeve.

The pressure valve is disposed in the bottom part of the valve carrier 36, namely in the axis of the valve carrier. Mounted to the front side of the valve carrier is an annular insert member 42 carrying the valve seat and cooperating with a valve body 43.

The insert member 42, at the outer side thereof, is provided with a circumferential edge 44 mounted on the bottom of the blind-end bore 35, thereby forming a central inlet chamber 46 and an annular chamber 45. The inlet chamber 46, through a casing channel 47, is in communication with the pump chamber 34. Located on the other side of the insert member 42 is the outlet chamber 48 in which is also disposed the valve ball 43. The outlet chamber 48, through a channel 49 extending in a direction oblique to the axis of the valve carrier 36, is in communication with the chamber 40.

An annular groove 50 extends between the circumferential edge 38 and the cylindrically shaped area of the valve carrier in the upper part, with channel 49 terminating in the said groove 50. Pressure fluid incoming through the pressure valve 10, hence, is first passed into the outlet chamber 48 from where it flows through the channel 49 into the annular groove 50. It then flows from the annular groove 50 through the annular gap 41 into the chamber 40.

The valve carrier 36, moreover, includes a blind-end bore 51 opening toward the chamber 40. Plugged into the blind-end bore 51 is a carrier 52 provided with a centrally arranged aperture or restrictor 17 located between the chamber 40 and the chamber separated by the carrier 52 in the blind-end bore 51.

Disposed between the aperture or restrictor 17 and the chamber 40 is a flat filter element 54.

The chamber confined within the blind-end bore 51, through a channel 55, is in communication with the aforedescribed annular chamber 45 which, in turn, communicates, through a casing channel, with the brake conduit 3. Hence, the connection of the pump 8 to the brake circuit has been established.

According to the bottom portion of FIG. 2, the valve carrier 36 is supplemented by a reservoir 15. The modifications are irrelevant.

The sleeve of the closure member 39, for this purpose, is extended so as to expand the chamber 40. The same now accommodates a piston 18 forced by a weakly loaded spring 63 toward the valve carrier 36. Once pressure fluid flows into the chamber 40, the piston 18 is displaced toward the bottom of the cup 39, thereby causing the chamber 40 to be expanded and to accommodate pressure fluid. The chamber provided behind the piston 18, through a bore in the closure element 39, is in communication with the atmosphere. Provided above the bore is a closure ring.

The check valve 16 is arranged as follows. The blind-end bore 51 in the valve body 36 is extended so that the chamber confined by the carrier 52 in the blind-end bore is expanded. The said chamber accommodates a valve body 65. The valve body 65 consists of a flexible material of hat-type configuration 65 which is turned about a head 67. An edge 68 on the head 67 firmly holds the hat.

The edge of the hat 66 protrudes beyond the head 67 and serves as a sealing lip which can be placed in abutment with the carrier 52, thereby blocking the communication. The head 67 is connected to a pin 68 plugged into a bore in the carrier 52, thereby guiding the valve body 65.

If a pressure is built up in the channel 55 from the brake conduit 3, the valve 16 closes, thereby preventing pressure from flowing into the reservoir 18. Conversely, once the reservoir is loaded, pressure can flow from the chamber 40 through the check valve 16 into the brake conduit 3.

Figure 3:
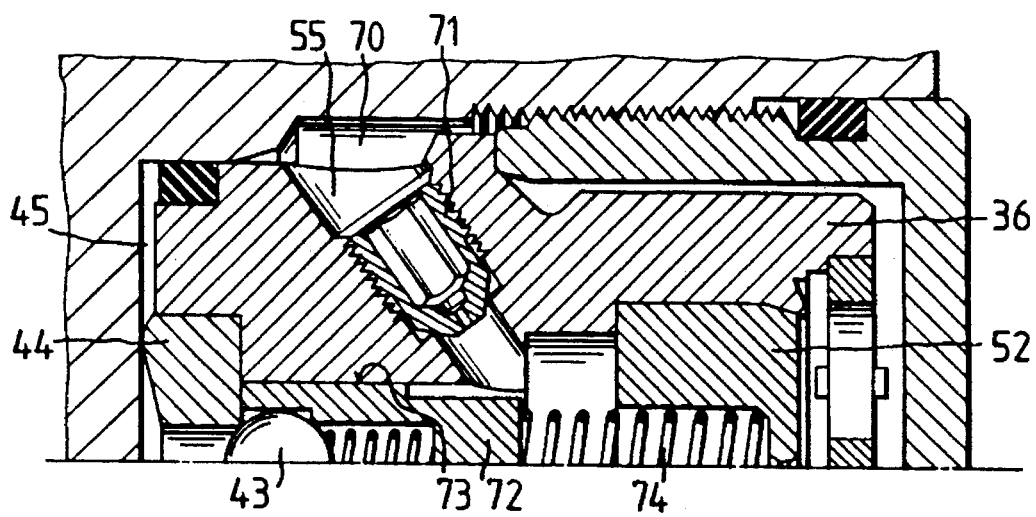
FIG. 3 shows a first embodiment of FIG. 2.

FIG. 3 shows a first modification of the valve carrier 36. The channel 55 now does not terminate any longer in the annular chamber 45 but rather in an annular chamber 70 at the point of transition from the smaller to the larger step of the blind-end bore. The channel in the pump casing 30 must now be shifted accordingly.

This arrangement involves the advantage that the edge 44 is not required to be absolutely packed.

Now, an aperture insert 71 can be screwed into the channel 55. The aperture cross-section can be adapted to the respective braking system. Another modification resides in that the valve ball 43 is not to be directly supported on the valve carrier 36 but rather on a sliding member 72 sliding within a bore 73 in the valve carrier 36 and being supported through a spring 74 on the carrier 52. The sliding member now can serve as a switch body for the channel 49 yet to be illustrated in closer detail in FIG. 5.

Figure 4:
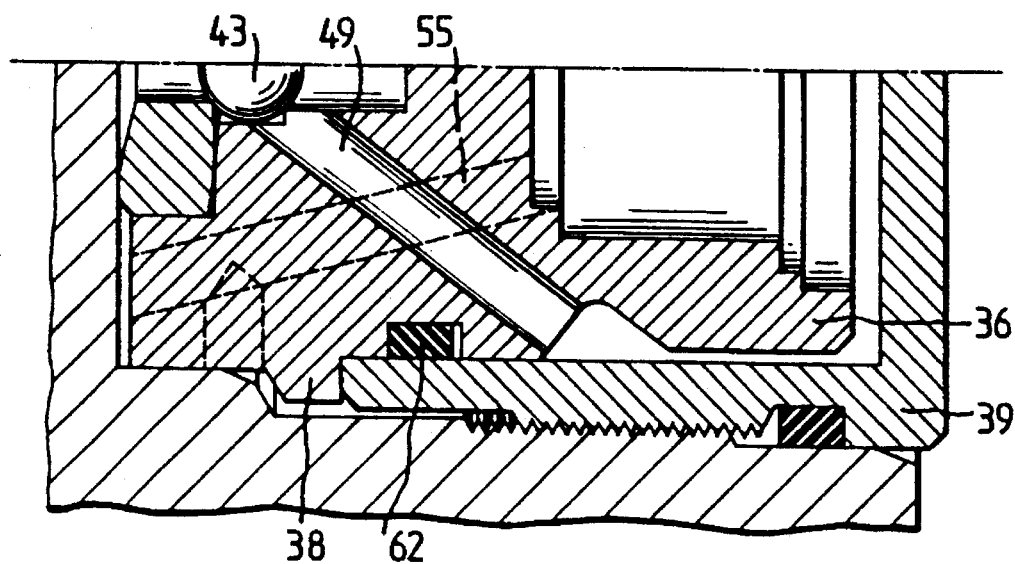
FIG. 4 shows a second embodiment of FIG. 2.

FIG. 4 shows another arrangement of the sealant 37 (see also FIG. 2). The sealant no longer is located underneath the edge 38 but rather above the inner wall of the sleeve of the closure member 39, corresponding therewith.

Figure 5:
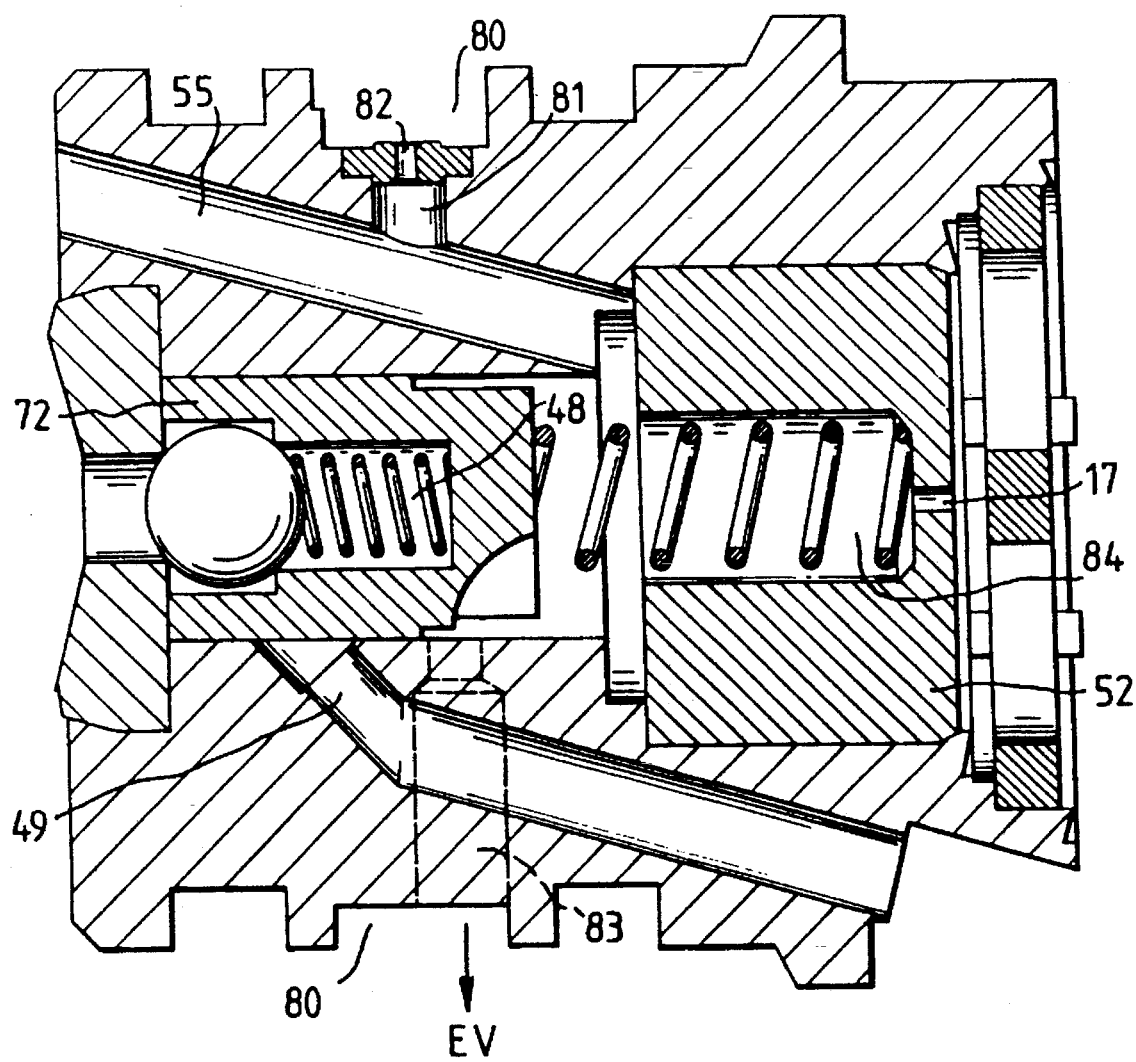
FIG. 5 shows another embodiment of FIG. 2 including an additional switch valve.

FIG. 5 shows another modification of the upper portion of FIG. 2, wherein a valve slide 72 (see FIG. 3) is provided in an axial bore of the valve carrier 36. The said slide fulfills two functions. On the one hand, it controls the channel 49; on the other hand it controls the by-pass leading to a restrictor 82 in the brake conduit.

In addition, the valve carrier 36 is provided with another groove 80 which can also be formed by the annular chamber 70.

The groove 80, on the one hand, through a channel 81, in which is inserted the aperture 82, is in communication with the channel 55. Another bore 83 connects the groove 80 to the chamber between the slide 72 and the carrier 52.

Provided in the casing (not shown) is a communication connecting the groove 80 to the inlet valve 4 (EV).

In a normal pressure decrease, in which no brake pressure control takes place, the connection between the master brake cylinder and the wheel brake is established through the channel 55, the chamber 84, and the channel 83, and from here through the open inlet valve to the wheel brake 2.

Once a brake slip control takes place, the pump starts to deliver so that pressure fluid is passed into the outlet chamber 48. As shown, the piston 72 is thereby displaced to the right, blocking the termination of the channel 83 in the chamber 84. The afore-mentioned connection is thereby discontinued. Pressure fluid from the master cylinder, therefore, now flows, through the restrictor 82, into the annular chamber 80 and from here to the inlet valve (EV).

This restriction causes the pressure ahead of the inlet valve to be lowered vis-a-vis the pressure in the master cylinder. This, in turn, has the consequence that the pressure drop at the inlet valve is reduced and, hence, as proved, the noise emission of the said valve is decreased.

In another displacement of the piston 72, virtually, the channel 49 is released, thereby establishing, through the channel 48, communication of the pump and of the restrictor 17 with the channel 55 and, hence, with the master cylinder and, establishing, through the restrictor 82, communication with the wheel cylinder, respectively.

We claim:

1. A pump, comprising:

a pump casing and carrier element within said casing, a pressure valve formed within the carrier element, the carrier element further defining a channel leading to a chamber located at a front side of said carrier element, a restrictor communicating with said chamber and in communication with a brake circuit to be energized, wherein the carrier element is of a cylindrical configuration wherein said channel leads to an annular groove and to said chamber said carrier element residing within a cup-shaped closure member.

2. A pump according to claim 1, wherein the carrier element contains a blind-end bore and further includes a carrier and said restrictor therein.

3. A pump according to claim 2, wherein said carrier includes a filter.

4. A pump according to claim 3, further including a check valve disposed between said chamber and said carrier.

5. A pump according to claim 1, wherein said closure member includes an outwardly extending portion defining a low pressure reservoir.

6. A pump according to claim 5, further including a piston disposed in said reservoir.

* * * * *